(12) United States Patent
Wang et al.

(10) Patent No.: US 11,078,939 B2
(45) Date of Patent: Aug. 3, 2021

(54) FASTENING APPARATUS AND FASTENING METHOD THEREOF

(71) Applicant: FIVETECH TECHNOLOGY INC., New Taipei (TW)

(72) Inventors: Ting-Jui Wang, New Taipei (TW); Hsu-Sheng Chang, New Taipei (TW); Chia-Ching Liao, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 117 days.

(21) Appl. No.: 16/052,728

(22) Filed: Aug. 2, 2018

(65) Prior Publication Data
US 2019/0040891 A1 Feb. 7, 2019

(30) Foreign Application Priority Data
Aug. 4, 2017 (TW) .................................. 106211547

(51) Int. Cl.
*F16B 5/06* (2006.01)
*F16B 21/08* (2006.01)
*F16B 2/18* (2006.01)

(52) U.S. Cl.
CPC .............. *F16B 5/0642* (2013.01); *F16B 2/18* (2013.01); *F16B 21/08* (2013.01)

(58) Field of Classification Search
CPC ........... F16B 21/08; F16B 2/18; F16B 5/0642
See application file for complete search history.

(56) References Cited

U.S. PATENT DOCUMENTS

| 1,209,624 A | * | 12/1916 | Rusha | ..................... A44B 5/005 24/99 |
| 2,501,151 A | * | 3/1950 | Ettore | ..................... A44B 5/002 24/97 |
| 2,586,434 A | * | 2/1952 | Marien | ..................... A44B 5/002 24/97 |

(Continued)

FOREIGN PATENT DOCUMENTS

| DE | 10245276 A1 | 4/2004 |
| TW | M301953 U | 12/2006 |

(Continued)

*Primary Examiner* — Robert Sandy
*Assistant Examiner* — David M Upchurch
(74) *Attorney, Agent, or Firm* — Schmeiser, Olsen & Watts, LLP

(57) ABSTRACT

A fastening apparatus includes a body; a fastener movably disposed at the body; and a resilient component disposed at the body, the resilient component having an end abutting against the body and another end abutting against the fastener such that the resilient component allows the fastener to be protruded from or inserted into the body normally, or the fastener in rotation and the resilient component interact with each other to effectuate limiting-stopping, interfering-stopping or interfering-abutting. The fastener enters the body disposed on the first object and compresses the resilient component. Then, the resilient component protrudes the fastener out of the body, thereby fastening the fastener to the second object quickly. Easy separation of the first and second objects entails moving the fastener into the body. A fastening method for the fastening apparatus is further introduced.

21 Claims, 12 Drawing Sheets

(56) References Cited

U.S. PATENT DOCUMENTS

| | | | | | |
|---|---|---|---|---|---|
| 3,093,220 | A | * | 6/1963 | Modrey | F16B 5/0642 |
| | | | | | 403/408.1 |
| 5,414,909 | A | * | 5/1995 | Kielty | A44B 3/04 |
| | | | | | 24/102 PL |
| 7,695,503 | B1 | * | 4/2010 | Kaiser | A61B 17/0401 |
| | | | | | 606/300 |
| 8,474,110 | B1 | * | 7/2013 | Sherriff | B60N 3/026 |
| | | | | | 24/297 |
| 9,282,789 | B1 | * | 3/2016 | Lavoie | A44B 5/002 |
| 2015/0082585 | A1 | * | 3/2015 | Mayberry | F41C 23/02 |
| | | | | | 24/505 |
| 2016/0324701 | A1 | * | 11/2016 | Cambridge | F16B 2/18 |

FOREIGN PATENT DOCUMENTS

| | | |
|---|---|---|
| TW | M422096 U | 2/2012 |
| TW | M556792 U | 3/2018 |

\* cited by examiner

133f (a)  (b)  (c)  (d)

FASTENING APPARATUS AND FASTENING METHOD THEREOF

CROSS-REFERENCE TO RELATED APPLICATION

This non-provisional application claims priority under 35 U.S.C. § 119 (a) on Patent Application No(s). 106211547 filed in Taiwan, R.O.C. on Aug. 4, 2017, the entire contents of which are hereby incorporated by reference.

FIELD OF THE INVENTION

The present disclosure relates to fastening apparatuses and fastening methods thereof and, more particularly, to a fastening apparatus and a fastening method thereof, adapted to fasten at least two objects together in such a manner to achieve quick coupling and easy demounting.

BACKGROUND OF THE INVENTION

A conventional way to couple two objects together involves fixing the two objects to each other with screws to ensure that the two objects are firmly coupled together and thus unlikely to separate.

Although the aforesaid conventional technique of fixation is effective in coupling the two objects together and minimizing separation thereof, it has the following drawbacks: first, difficult to put together the two objects; and, second, difficult to separate the two objects because of the screwing mechanism.

Therefore, it is imperative to provide a fastening apparatus conducive to quick coupling and easy demounting so as to overcome the aforesaid drawbacks of the prior art.

SUMMARY OF THE INVENTION

In view of the aforesaid drawbacks of the prior art, it is an objective of the present disclosure to provide a fastening apparatus conducive to quick coupling and easy demounting.

In order to achieve the above and other objectives, the present disclosure provides a fastening apparatus, comprising: a body; a fastener movably disposed at the body; and a resilient component disposed at the body, the resilient component having an end abutting against the body and another end abutting against the fastener such that the resilient component allows the fastener to be protruded from or inserted into the body normally, or the fastener in rotation and the resilient component interact with each other to effectuate limiting-stopping, interfering-stopping or interfering-abutting.

In order to achieve the above and other objectives, the present disclosure further provides a fastening method for the fastening apparatus, requiring the fastening apparatus and a second object, comprising moving the second object downward into a fastening range of the fastener and then allowing the fastener resiliently protruded to engage with the second object or allowing the fastener inserted to move upward and thus disengage with the second object.

Optionally, the body has a receiving region for receiving the fastener and the resilient component.

Optionally, the body has a connecting portion for connecting the body to the first object.

Optionally, the fastener has a fastening portion and a pivotal connection portion. The fastening portion extends out of the body. The pivotal connection portion and the body are movably coupled together.

Optionally, the fastening portion has a guiding surface and an abutting surface, and the fastening portion is panel-like, arcuate or bent.

Optionally, the resilient component fits around the pivotal connection portion.

Optionally, the resilient component is a torsional spring, or the resilient component is integrally formed with the fastener or the body.

Optionally, the pivotal connection portion is implemented as a pivot which penetrates the body and the fastener, or is a protruding post which extends to at least one side of the fastener and penetrates the body.

Optionally, the connecting portion is coupled to the first object by riveting, extending, welding, latching or fastening.

Optionally, the connecting portion has a material admitting space for admitting a material of the first object such that the connecting portion and the first object are coupled together.

Optionally, the fastening apparatus is disposed at a carrier.

Optionally, the carrier is a cord or a tray.

Optionally, the carrier has a lid.

Optionally, the resilient component is implemented as a combination of an elastomer and a pusher.

Optionally, the pusher extends to form an engaging portion, and, depending on motion of the fastener, the engaging portion pushes the pusher such that the pusher protrudes from or retreats into the body.

Optionally, the fastener has a limiting portion for limiting the position of the pusher so as to cause the fastener to stay at a pushed position or cause the pusher to stay at a pushed position.

Optionally, the engaging portion is columnar, threaded, externally engaging or internally engaging.

Optionally, the limiting portion is concave, convex, columnar, planar, layered, arcuate or curved, or the pusher is concave, convex, columnar, planar, layered, arcuate or curved.

Optionally, the fastener in rotation abuts against, or is abutted against by, the resilient component and thus normally or temporarily tends to be upright or tends to protrude upright or tends to lie laterally or tends to protrude laterally.

Optionally, the fastener has an operating portion for controlling the fastener to rotate or move.

Optionally, the body has a stamping surface to be pressed under an applied force to sink the connecting portion into the first object, so as to effect connection.

Optionally, the body has higher rigidity than the first object, whereas the connecting portion of the body has a squeezing portion and a material admitting space, and the squeezing portion squeezes a material of the first object such that the material enters or flows into the material admitting space.

Optionally, the stamping surface flanks the fastener, lies outside the fastener, lies above the body, or surrounds the body.

Optionally, the fastener has a limiting portion such that the limiting portion and the resilient component limit a position of the fastener, or the limiting portion determines a position which the fastener stays at.

The present disclosure further provides a fastening method for the fastening apparatus. The fastening method comprises: placing the body on the first object; moving the fastener into the body to compress the resilient component, allowing the fastener to be protruded from the body with the resilient component; and thus fastening the second object in place with the fastener. The fastening method further comprises: moving the fastener into the body to therefore separate the first object and the second object. Hence, the fastening method achieves quick coupling and easy demounting.

DETAILED DESCRIPTION OF THE PREFERRED EMBODIMENTS

Figure 1:
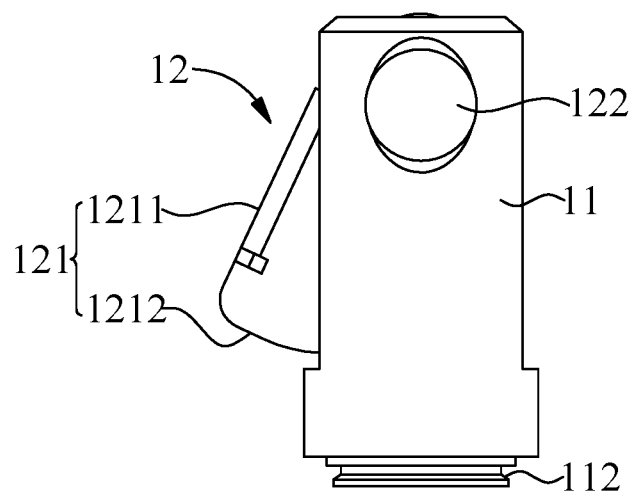
FIG. 1 is a schematic view 1 of a locked state of a fastening apparatus according to the first preferred embodiment of the present disclosure.
Figure 2:
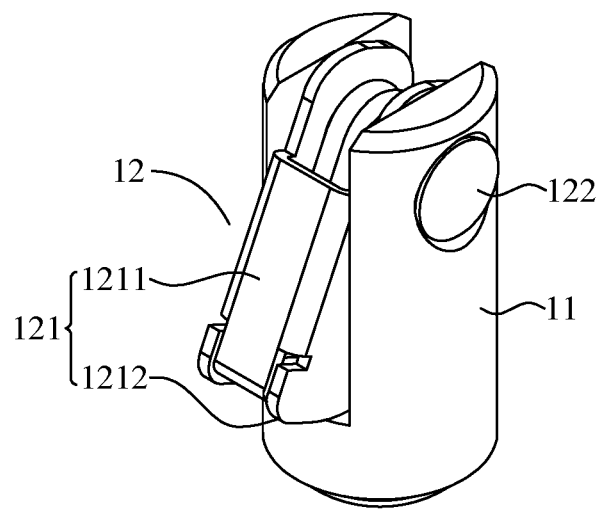
FIG. 2 is a schematic view 2 of a locked state of the fastening apparatus according to the first preferred embodiment of the present disclosure.
Figure 3:
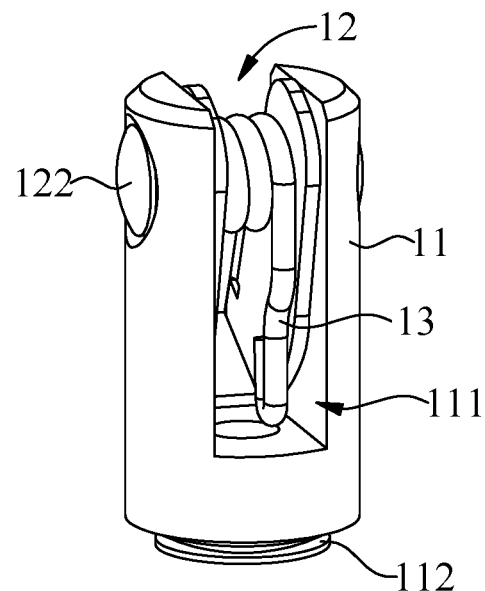
FIG. 3 is a schematic view 3 of a locked state of the fastening apparatus according to the first preferred embodiment of the present disclosure.
Figure 4:
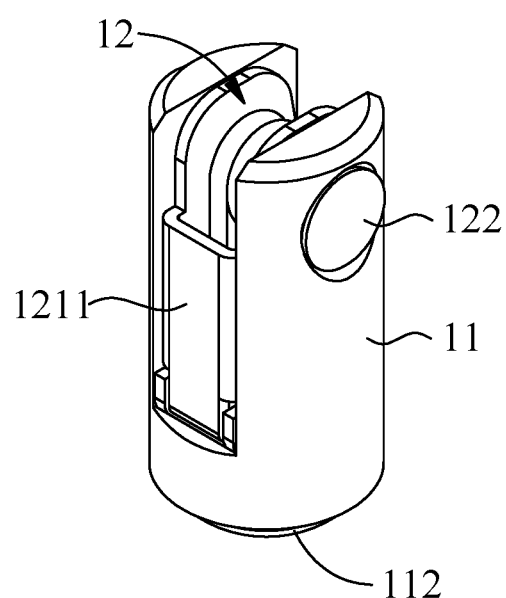
FIG. 4 is a schematic view of an unlocked state of the fastening apparatus according to the first preferred embodiment of the present disclosure.
Figure 5:
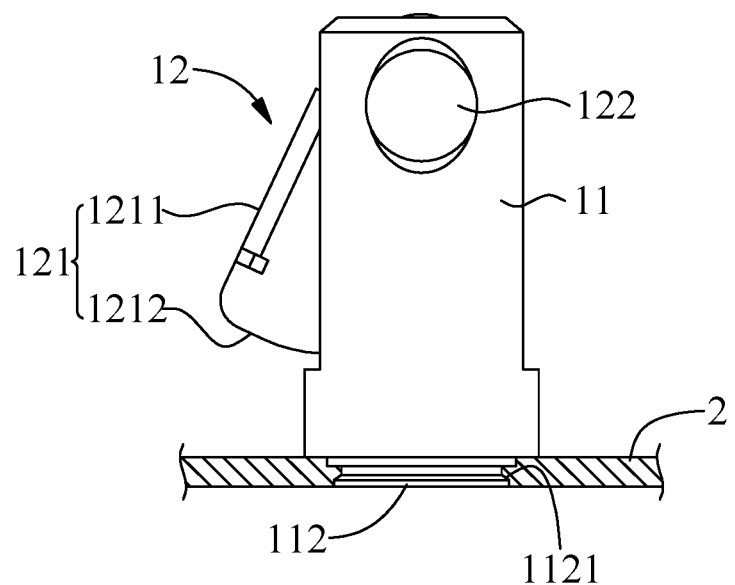
FIG. 5 is a schematic view 1 of an assembly and usage state of the fastening apparatus according to the first preferred embodiment of the present disclosure.
Figure 7:
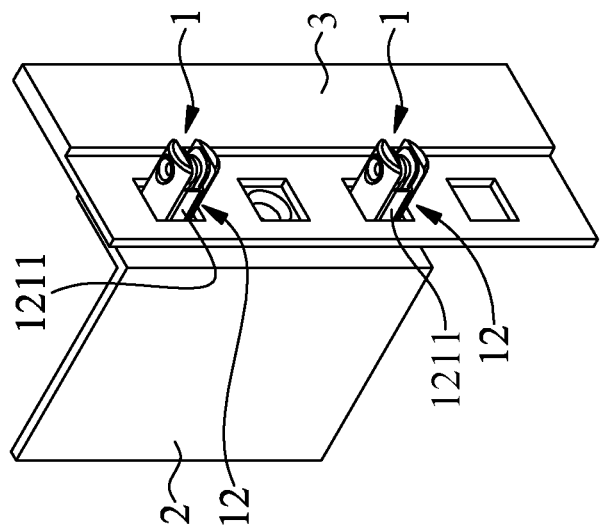
FIG. 7 is a schematic view 3 of an assembly and usage state of the fastening apparatus according to the first preferred embodiment of the present disclosure.
Figure 6:
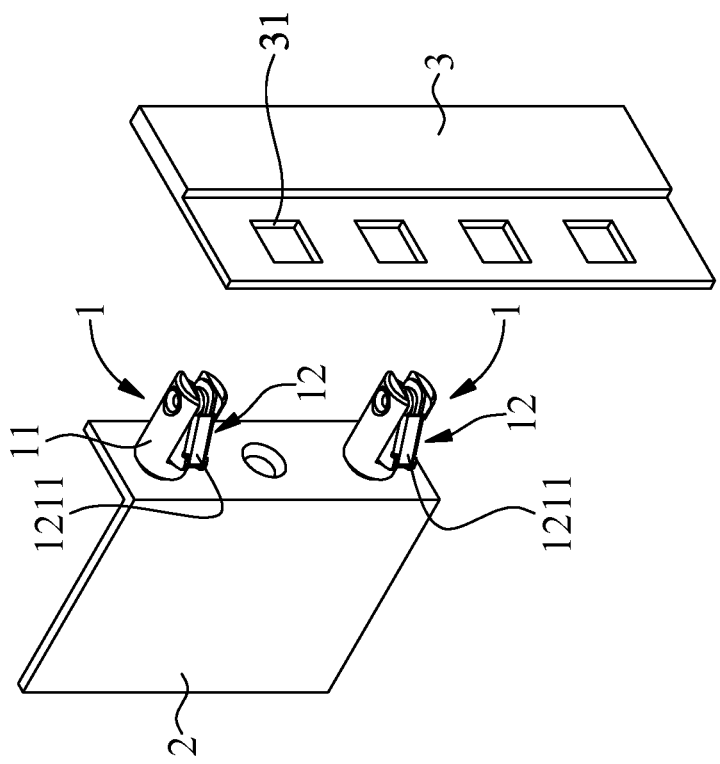
FIG. 6 is a schematic view 2 of an assembly and usage state of the fastening apparatus according to the first preferred embodiment of the present disclosure.
Figure 9:
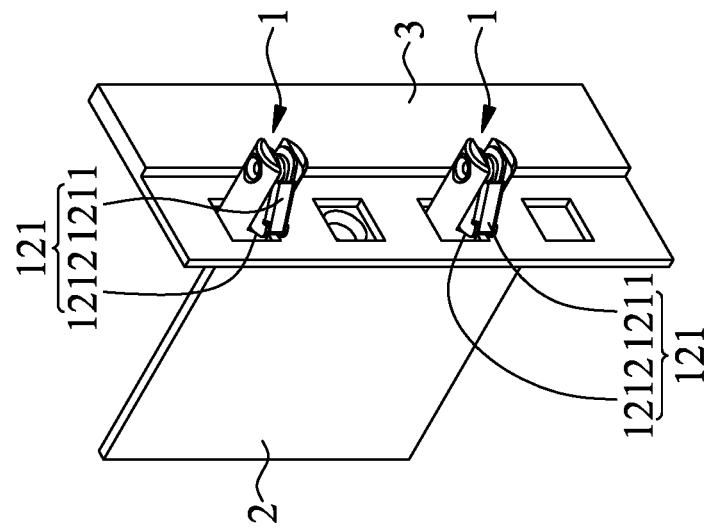
FIG. 9 is a schematic view 5 of an assembly and usage state of the fastening apparatus according to the first preferred embodiment of the present disclosure.
Figure 8:
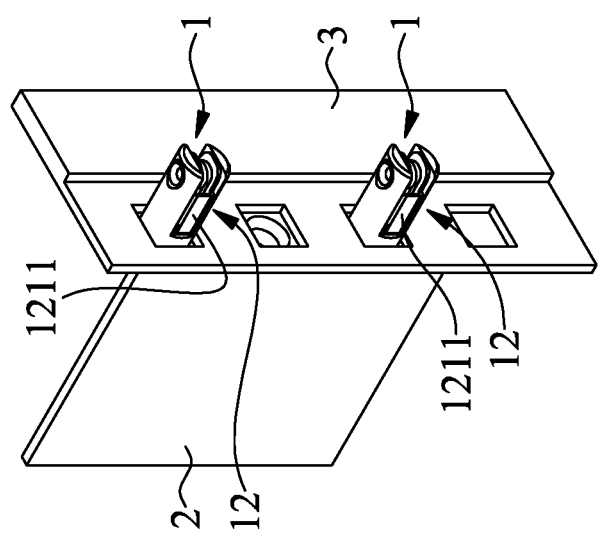
FIG. 8 is a schematic view 4 of an assembly and usage state of the fastening apparatus according to the first preferred embodiment of the present disclosure.

Objectives, features, and advantages of the present disclosure are hereunder illustrated with specific embodiments, depicted with drawings, and described below.

Referring to FIG. 1 through FIG. 4, the present disclosure provides a fastening apparatus and a fastening method for the fastening apparatus. The fastening apparatus 1 comprises a body 11, a fastener 12 and a resilient component 13.

The fastener 12 is movably disposed at the body 11.

The resilient component 13 is disposed at the body 11. The resilient component 13 has one end abutting against the body 11 and the other end abutting against the fastener 12 such that the resilient component 13 allows the fastener 12 to be protruded from or inserted into the body 11 normally. In this embodiment, the fastener 12 is protruded from the body 11 normally.

The body 11 has a receiving region 111 for receiving the fastener 12 and the resilient component 13. The body 11 has a connecting portion 112 for connecting the body 11 to a first object 2. The fastener 12 has a fastening portion 121 and a pivotal connection portion 122. The fastening portion 121 extends out of the body 11. The fastening portion 121 has a guiding surface 1211 and an abutting surface 1212. The pivotal connection portion 122 and the body 11 are movably coupled together. In this embodiment, the fastening portion 121 is panel-like. The pivotal connection portion 122 is implemented as a pivot which penetrates the body 11 and the fastener 12. The resilient component 13 fits around the pivotal connection portion 122. The resilient component 13 is a torsional spring. Alternatively, the resilient component 13 is integrally formed with the fastener 12 or the body 11.

Referring to FIG. 5 through FIG. 9, to begin operation, a user puts one or more fastening apparatuses 1 on the first object 2, with the first object 2 in contact with the connecting portion 112 of each body 11. The connecting portion 112 has a material admitting space 1121 for admitting a material which the first object 2 is made of, thereby connecting the connecting portion 112 and the first object 2. The connecting portion 112 is coupled to the first object 2 by riveting, extending, welding, latching or fastening.

To couple a second object 3 to the first object 2, each through hole 31 of the second object 3 penetrates the fastening apparatus 1 on the first object 2 such that the inner edge of each through hole 31 abuts against the guiding surface 1211 of each fastener 12 and compresses each fastener 12, allowing each fastener 12 to enter the receiving region 111 of each body 11 and compress each resilient component 13. After the inner edge of each through hole 31 has passed through each fastener 12, each resilient component 13 renders each fastener 12 protruded from each body 11 such that the abutting surface 1212 of each fastening portion 121 abuts against the surface surrounding each through hole 31 to therefore fasten each fastener 12 to the second object 3.

Demounting the second object 3 requires the user to press against the guiding surface 1211 of each fastening portion 121 and thus move each fastener 12 to the receiving region 111 of each body 11 while moving the abutting surface 1212 away from the surface surrounding the through hole 31, such that each through hole 31 of the second object 3 separates from each fastening apparatus 1, thereby separating the first object 2 and the second object 3. Upon the separation of the first object 2 and the second object 3, each fastener 12 restores its normal state: being protruded from each body 11. At this point in time, the first object 2 and the second object 3 are ready for use in the next instance of fastening, so as to achieve quick coupling and easy demounting.

In addition to the aforesaid fastening method, the present disclosure further provides a fastening method for a fastening apparatus. The fastening method involves the fastening apparatus 1 and the second object 3. According to the fastening method, the second object 3 moves downward to enter the fastening range of the fastener 12 such that the fastener 12 which is resiliently protruded can engage with the second object 3, or, after being inserted, the fastener 12 moves upward to disengage with the second object 3.

Figure 10:
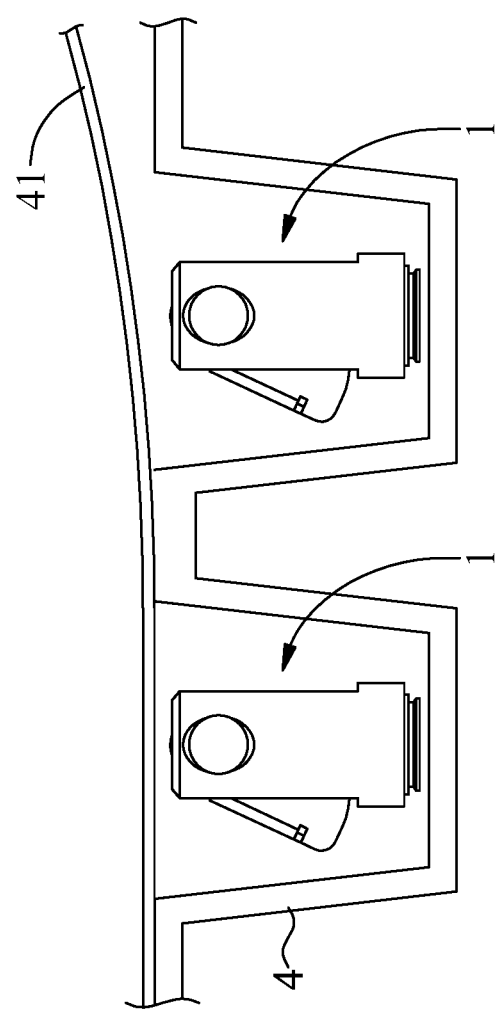
FIG. 10 is a schematic view of a storage state of the fastening apparatus of the present disclosure.

Referring to FIG. 10, in this embodiment, the plurality of fastening apparatuses 1 is disposed at a carrier 4. The carrier 4 is a cord or a tray. The carrier 4 has a lid 41 to thereby contain the plurality of fastening apparatuses 1, thereby facilitating storage and delivery.

Figure 11:
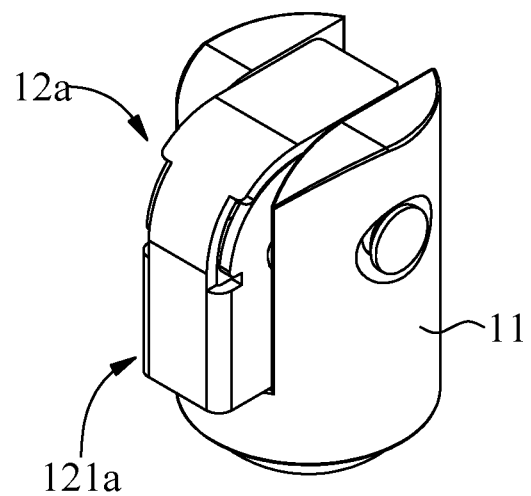
FIG. 11 is a perspective view of the fastening apparatus according to the second preferred embodiment of the present disclosure.

Referring to FIG. 11, in this embodiment, the fastening portion 121a of the fastener 12a is arcuate.

Figure 12:
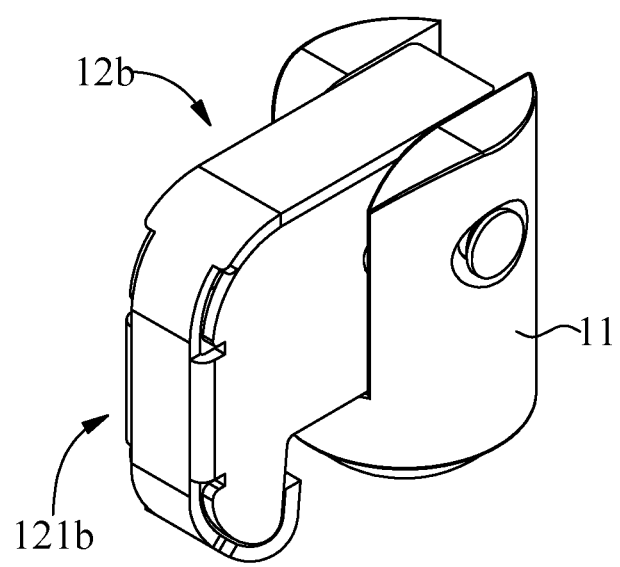
FIG. 12 is a perspective view of the fastening apparatus according to the third preferred embodiment of the present disclosure.

Referring to FIG. 12, in this embodiment, the fastening portion 121b of the fastener 12b is bent.

Figure 13:
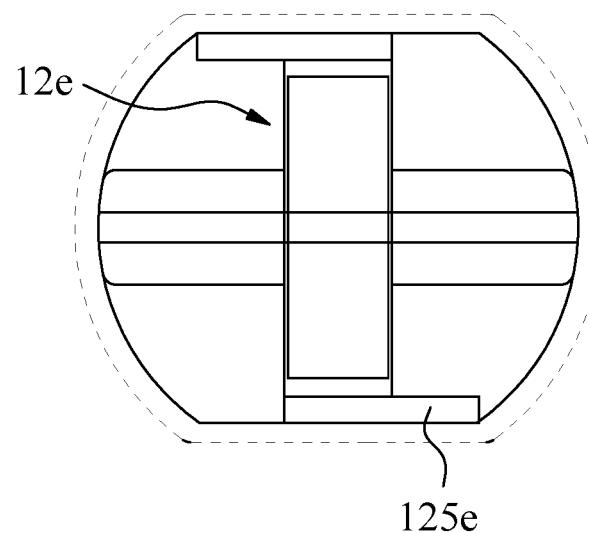
FIG. 13 is a schematic view 1 of the fastening apparatus according to the fourth preferred embodiment of the present disclosure.
Figure 14:
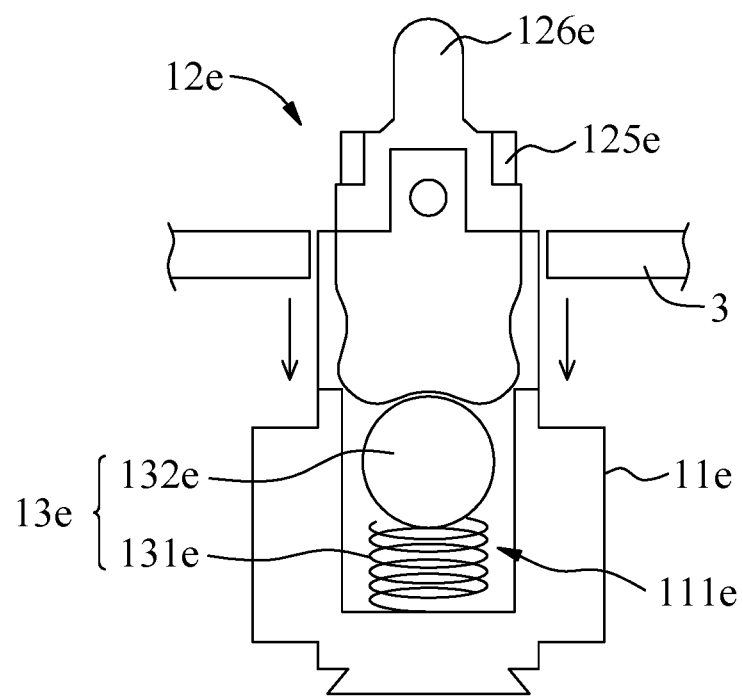
FIG. 14 is a schematic view 2 of the fastening apparatus according to the fourth preferred embodiment of the present disclosure.
Figure 15:
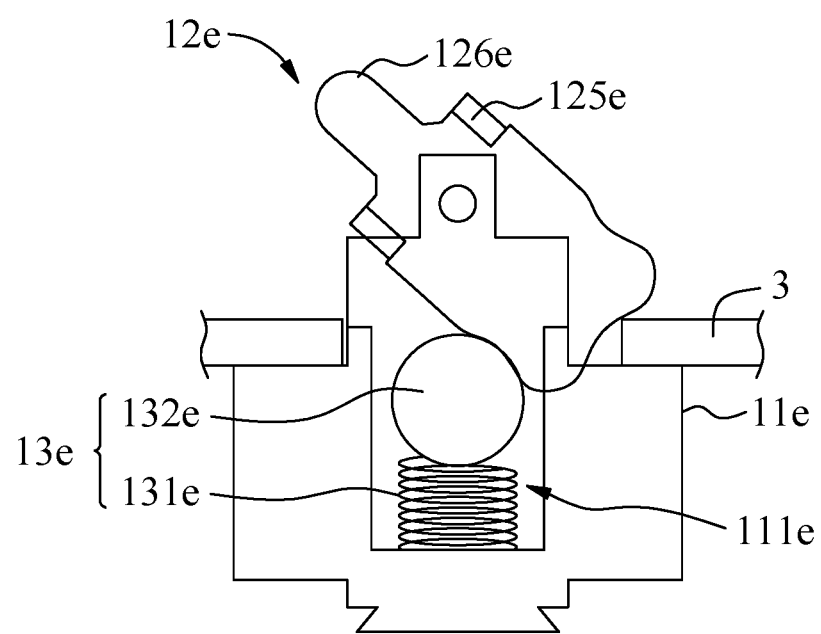
FIG. 15 is a schematic view 3 of the fastening apparatus according to the fourth preferred embodiment of the present disclosure.

Referring to FIG. 13 through FIG. 15, in this embodiment, the resilient component 13e is implemented as a combination of an elastomer 131e and a pusher 132e, whereas the resilient component 13e is disposed in the receiving region 111e of the body 11e.

To couple the second object 3 to the fastener 12e, the user moves the second object 3 downward so that the second object 3 enters the fastening range of the fastener 12e. Then, a control portion 126e of the fastener 12e moves out and engages with the second object 3; meanwhile, being pushed by the elastomer 131e, the pusher 132e abuts against the fastener 12e such that the fastener 12e fastens the second object 3 in place.

Figure 16:
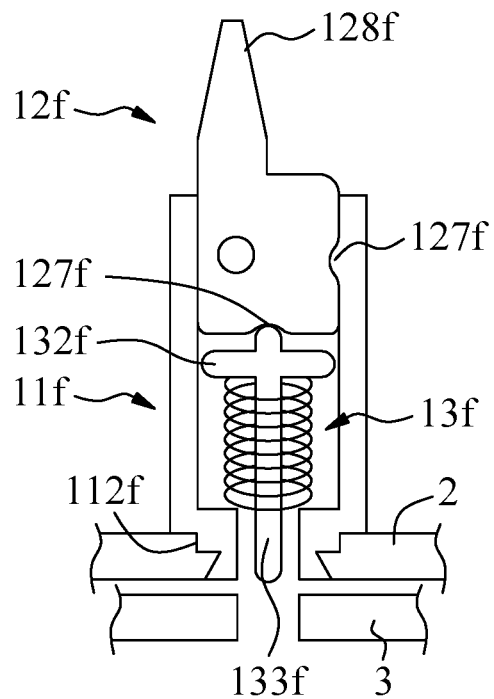
FIG. 16 is a schematic view 1 of the fastening apparatus according to the fifth preferred embodiment of the present disclosure.
Figure 19:
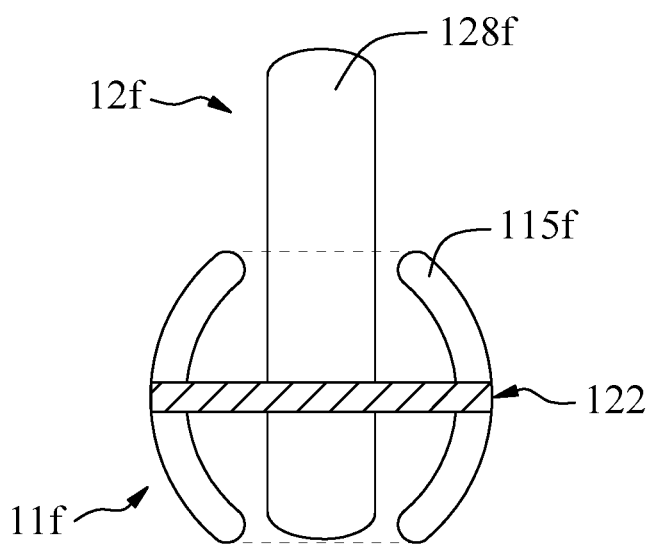
FIG. 19 is a top schematic view of the fastening apparatus according to the fifth preferred embodiment of the present disclosure.

Referring to FIG. 16 and FIG. 19, in this embodiment, the pusher 132f extends to form an engaging portion 133f. Depending on the motion of the fastener 12f, the engaging portion 133f pushes the pusher 132f such that the pusher 132f protrudes and engages with the second object 3 or retreats into the body 11f and thus separates from the second object 3. In this embodiment, the fastener 12f has two limiting portions 127f. Each limiting portion 127f limits the position of the pusher 132f and thus causes the fastener 12f to stay at a pushed position or causes the pusher 132f to stay at a pushed position. The limiting portions 127f are concave, convex, columnar, planar, layered, arcuate or curved. The pusher 132f is concave, convex, columnar, planar, layered, arcuate or curved. The fastener 12f has an operating portion 128f for controlling the fastener 12f to rotate or move.

Figure 17:
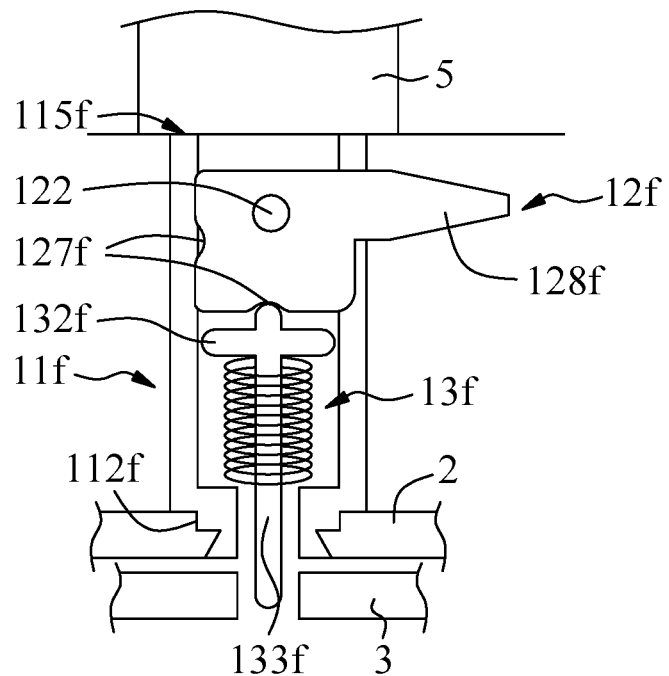
FIG. 17 is a schematic view 2 of the fastening apparatus according to the fifth preferred embodiment of the present disclosure.

The fastener 12f in rotation abuts against, or is abutted against by, the resilient component 13f and thus normally or temporarily tends to be upright or tends to protrude upright (shown in FIG. 16) or tends to lie laterally or tends to protrude laterally (shown in FIG. 17). Furthermore, the fastener 12f in rotation and the resilient component 13f interact with each other to effectuate limiting-stopping, interfering-stopping or interfering-abutting.

The body 11f has a stamping surface 115f to be pressed under an applied force exerted by a die 5 to sink the connecting portion 112f into the first object 2, so as to effect connection. The stamping surface 115f flanks the fastener 12f (shown in FIG. 19), lies outside the fastener 12f (shown in FIG. 16 and FIG. 17), lies above the body 11f, or surrounds the body 11f.

Figure 18:
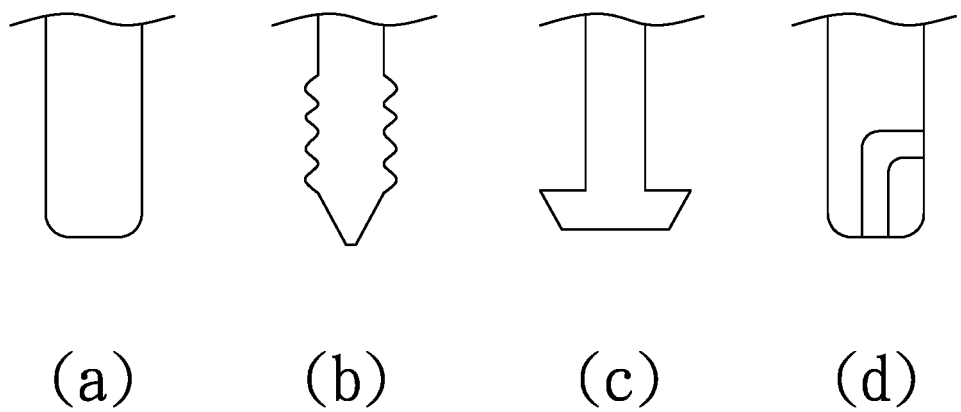
FIG. 18 is a schematic view of an engaging portion of the fastening apparatus according to the fifth preferred embodiment of the present disclosure.

In this embodiment, the engaging portion 133f is columnar (shown in FIG. 18 (a)), threaded (shown in FIG. 18 (b)), externally engaging (shown in FIG. 18 (c)) or internally engaging (shown in FIG. 18 (d)).

Figure 20:
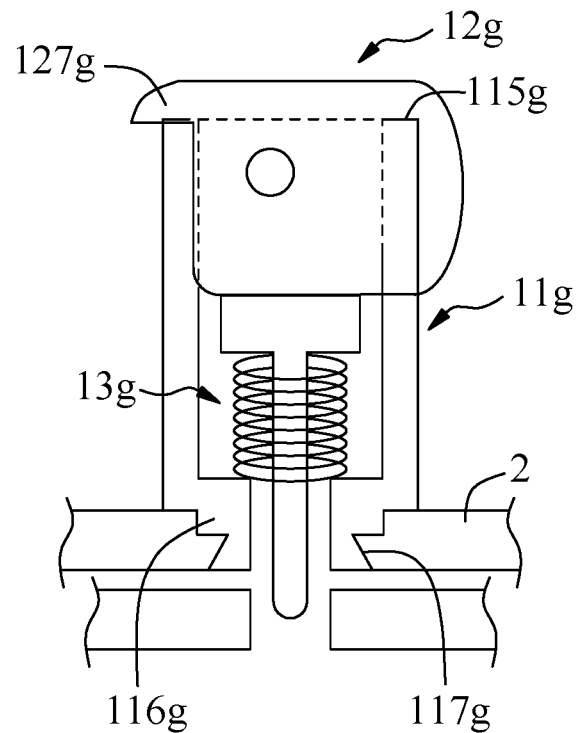
FIG. 20 is a schematic view 1 of the fastening apparatus according to the sixth preferred embodiment of the present disclosure.
Figure 21:
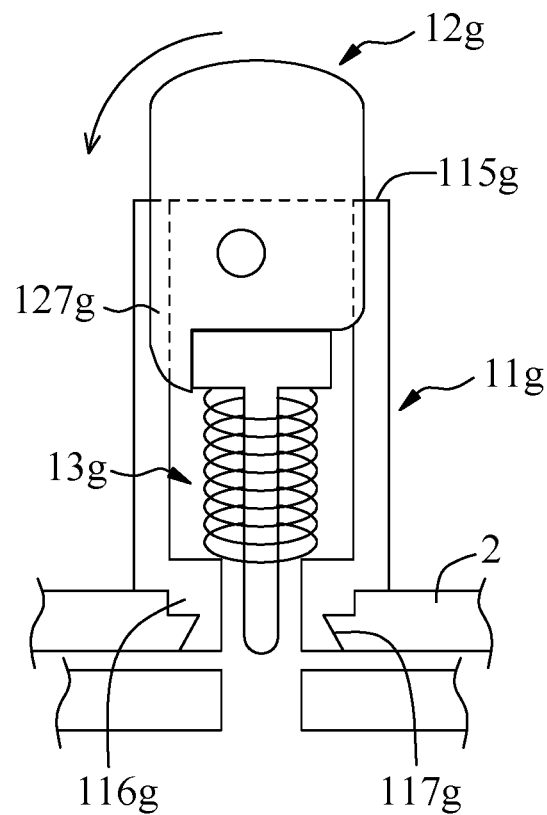
FIG. 21 is a schematic view 2 of the fastening apparatus according to the sixth preferred embodiment of the present disclosure.

Referring to FIG. 20 and FIG. 21, in this embodiment, the body 11g not only has higher rigidity than the first object 2 but also has a squeezing portion 116g and a material admitting space 117g. Under an applied force exerted on the stamping surface 115g, the squeezing portion 116g squeezes a material of the first object 2 such that the material enters or flows into the material admitting space 117g.

The fastener 12g has a limiting portion 127g. The limiting portion 127g and the resilient component 13g together limit the position of the fastener 12g or position the fastener 12 in place such that the fastener 12g in rotation and the resilient component 13g interact with each other to effectuate limiting-stopping, interfering-stopping or interfering-abutting. The limiting portion 127g is concave, convex, columnar, planar, layered, arcuate or curved.

Although the present disclosure is disclosed above by preferred embodiments, the preferred embodiments are not restrictive of the present disclosure. Equivalent changes and replacements made by persons skilled in the art to the preferred embodiments must be deemed falling within the scope of the present disclosure. Accordingly, the legal protection for the present disclosure should be defined by the appended claims.

What is claimed is:

1. A fastening apparatus, comprising:
   a body;
   a fastener movably disposed at the body; and
   a resilient component disposed at the body;
   wherein the body has a receiving region for receiving the fastener and the resilient component, a whole width of the fastener is less than a whole width of the receiving region, the body is configured to pass through a through-hole of an object, the resilient component having an end abutting against the body and another end abutting against the fastener such that the resilient component applies a force in a direction away from the receiving region of the body to urge the fastener to be protruded away from the receiving region of the body to engage with an edge of the through-hole of the object.

2. The fastening apparatus of claim 1, wherein the body has a connecting portion for connecting the body to the first object.

3. The fastening apparatus of claim 1, wherein the fastener has a fastening portion and pivotal connection portion, the fastening portion extending out of the body, allowing the pivotal connection portion and the body to be movably coupled together.

4. The fastening apparatus of claim 3, wherein the fastening portion has a guiding surface and an abutting surface and is arcuate or bent.

5. The fastening apparatus of claim 4, wherein the resilient component fits around the pivotal connection portion.

6. The fastening apparatus of claim 1, wherein the resilient component is a torsional spring, or the resilient component is integrally formed with the fastener or the body.

7. The fastening apparatus of claim 2, wherein the connecting portion has a material admitting space for admitting a material of the first object such that the connecting portion and the first object are coupled together.

8. The fastening apparatus of claim 1, wherein the fastening apparatus is disposed at a carrier, the carrier being a cord or a tray or having a lid.

9. The fastening apparatus of claim 1, wherein the resilient component is implemented as a combination of an elastomer and a pusher.

10. The fastening apparatus of claim 9, wherein the pusher extends to form an engaging portion, and, depending on motion of the fastener, the engaging portion pushes the pusher such that the pusher protrudes from or retreats into the body.

11. The fastening apparatus of claim 10, wherein the fastener has a limiting portion for limiting a position of the pusher, thereby causing the fastener to stay at a pushed position or causing the pusher to stay at a pushed position.

12. The fastening apparatus of claim 11, wherein the engaging portion is columnar, threaded, externally engaging or internally engaging.

13. The fastening apparatus of claim 12, wherein the limiting portion is concave, convex, columnar, planar, layered, arcuate or curved, or the pusher is concave, convex, columnar, planar, layered, arcuate or curved.

14. The fastening apparatus of claim 1, wherein the fastener in rotation abuts against, or is abutted against by, the resilient component and thus normally or temporarily tends to be upright or tends to protrude upright or tends to lie laterally or tends to protrude laterally.

15. The fastening apparatus of claim 1, wherein the fastener has an operating portion for controlling the fastener to rotate or move.

16. The fastening apparatus of claim 2, wherein the body has a stamping surface to be pressed under an applied force to sink the connecting portion into the first object, so as to effect connection.

17. The fastening apparatus of claim 2, wherein the body has higher rigidity than the first object, whereas the connecting portion of the body has a squeezing portion and a material admitting space, and the squeezing portion squeezes a material of the first object such that the material enters or flows into the material admitting space.

18. The fastening apparatus of claim 17, wherein the stamping surface flanks the fastener, lies outside the fastener, lies above the body, or surrounds the body.

19. The fastening apparatus of claim 1, wherein the fastener has a limiting portion such that the limiting portion and the resilient component limit a position of the fastener, or the limiting portion determines a position which the fastener stays at.

20. The fastening apparatus of claim 19, wherein the limiting portion is concave, convex, columnar, planar, layered, arcuate or curved.

21. A fastening method for a fastening apparatus, requiring the fastening apparatus of claim 1 and a second object, comprising moving the second object downward into a fastening range of the fastener and then allowing the fastener resiliently protruded to engage with the second object or allowing the fastener inserted to move upward and thus disengage with the second object.

\* \* \* \* \*